US008286359B2

(12) United States Patent
Ashfield

(10) Patent No.: US 8,286,359 B2
(45) Date of Patent: Oct. 16, 2012

(54) BATTERY OPERATED CHAIN SAW

(75) Inventor: Lea Antony Ashfield, Hong Kong (CN)

(73) Assignee: Techtronic Outdoor Products Technology Limited, Hamilton (BM)

( * ) Notice: Subject to any disclaimer, the term of this patent is extended or adjusted under 35 U.S.C. 154(b) by 1825 days.

(21) Appl. No.: 10/674,852

(22) Filed: Sep. 29, 2003

(65) Prior Publication Data

US 2004/0098869 A1 May 27, 2004

Related U.S. Application Data

(63) Continuation of application No. 29/171,289, filed on Nov. 19, 2002, now Pat. No. Des. 481,601.

(51) Int. Cl.
*B27B 17/02* (2006.01)
*B23D 57/02* (2006.01)

(52) U.S. Cl. .......................................... 30/383; 30/381

(58) Field of Classification Search ............... 30/DIG. 1, 30/122, 381–387, 166.3; D8/65
See application file for complete search history.

(56) References Cited

U.S. PATENT DOCUMENTS

| | | | | | |
|---|---|---|---|---|---|
| 2,827,932 | A | * | 3/1958 | Strunk | 30/386 |
| D223,600 | S | | 5/1972 | Averitt | D8/65 |
| D230,006 | S | | 1/1974 | Guthrie et al. | D8/65 |
| 3,844,360 | A | * | 10/1974 | Green et al. | 173/170 |
| D233,725 | S | | 11/1974 | Guthrie et al. | D8/65 |
| D237,352 | S | | 10/1975 | Shymkus | D8/65 |
| 3,934,344 | A | * | 1/1976 | Inaga | 30/381 |
| 4,193,193 | A | | 3/1980 | Holzworth | 30/382 |
| D255,770 | S | | 7/1980 | Asamoto | D8/65 |
| 4,365,416 | A | | 12/1982 | Overbury | 30/382 |
| 4,389,779 | A | * | 6/1983 | Overbury et al. | 30/382 |
| D272,310 | S | | 1/1984 | Dynie et al. | D8/65 |
| D273,456 | S | | 4/1984 | McDougall et al. | D8/65 |
| 4,583,291 | A | * | 4/1986 | Pilatowicz | 30/383 |
| D288,896 | S | | 3/1987 | Yamamoto et al. | D8/65 |
| 4,680,862 | A | | 7/1987 | Wieland et al. | 30/381 |
| D301,961 | S | | 7/1989 | Narisue et al. | D8/8 |
| D309,087 | S | | 7/1990 | Yamamoto et al. | D8/65 |
| D313,538 | S | | 1/1991 | Fushiya et al. | D8/8 |
| 5,016,355 | A | * | 5/1991 | Gassen et al. | 30/383 |
| D325,330 | S | | 4/1992 | Barnhill | D8/65 |
| D325,859 | S | | 5/1992 | Yokota et al. | D8/65 |
| 5,184,403 | A | | 2/1993 | Schliemann | 30/382 |
| D333,953 | S | | 3/1993 | Miyoshi et al. | D8/8 |
| 5,213,913 | A | * | 5/1993 | Anthony et al. | 429/97 |
| 5,245,757 | A | | 9/1993 | Weissert et al. | 30/383 |
| D350,680 | S | | 9/1994 | Berfield et al. | D8/65 |
| D365,262 | S | | 12/1995 | Beaulieu et al. | D8/65 |
| D381,249 | S | | 7/1997 | Hubbe | D8/65 |
| D382,451 | S | | 8/1997 | Kikuchi | D8/8 |
| D385,766 | S | | 11/1997 | Kondo et al. | D8/65 |

(Continued)

*Primary Examiner* — Hwei C Payer

(74) *Attorney, Agent, or Firm* — Michael Best & Friedrich LLP

(57) ABSTRACT

A battery operated chain saw including a frame, an electric motor and a battery. The frame includes a housing and a chain bar. The frame forms a front handle and a rear handle. The electric motor is connected to the frame. The battery is coupled to the electric motor. The battery is located at a position on the frame proximate the front handle to provide a front-to-rear chain saw center-of-gravity located proximate the front handle. The battery is part of a power pack removably connected to the frame. The power pack is located spaced from a front-to-rear centerline of the frame located along the chain bar. The power pack includes an electrical coupling side which is not located on a lateral side of the power pack.

19 Claims, 3 Drawing Sheets

U.S. PATENT DOCUMENTS

| | | | | |
|---|---|---|---|---|
| 5,685,080 | A | 11/1997 | Amano et al. | 30/383 |
| D389,026 | S | 1/1998 | Amano et al. | D8/65 |
| D408,246 | S | 4/1999 | Juratovac et al. | D8/65 |
| D408,247 | S | 4/1999 | Juratovac et al. | D8/65 |
| D408,700 | S | 4/1999 | Juratovac et al. | D8/65 |
| 6,016,604 | A | 1/2000 | Wolf et al. | 30/383 |
| D434,620 | S | 12/2000 | Martin | D8/8 |
| D445,657 | S | 7/2001 | Jong | D8/65 |
| D460,329 | S | 7/2002 | Waldron | D8/9 |
| D460,667 | S | 7/2002 | Waldron | D8/8 |
| 6,415,516 | B1 | 7/2002 | Tirado et al. | 30/386 |
| D481,601 | S * | 11/2003 | Ashfield | D8/65 |
| D560,456 | S * | 1/2008 | Gieske et al. | D8/65 |
| 2007/0240892 | A1 * | 10/2007 | Brotto et al. | 173/217 |
| 2010/0218386 | A1 * | 9/2010 | Ro kamp et al. | 30/277.4 |
| 2010/0218967 | A1 * | 9/2010 | Ro kamp et al. | 173/217 |
| 2011/0162219 | A1 * | 7/2011 | Okouchi | 30/383 |
| 2012/0031635 | A1 * | 2/2012 | Svennung et al. | 173/20 |
| 2012/0066917 | A1 * | 3/2012 | Okouchi | 30/386 |

* cited by examiner

BATTERY OPERATED CHAIN SAW

CROSS-REFERENCE TO RELATED APPLICATION

This is a continuation application of U.S. patent application Ser. No. 29/171,289 filed Nov. 19, 2002, now U.S. Pat. No. D481,601, which is hereby incorporated by reference in its entirety.

BACKGROUND OF THE INVENTION

1. Field of the Invention

The present invention relates to battery operated power tools and, more particularly, to battery operated chain saw.

2. Brief Description of Prior Developments

U.S. Pat. No. Des. 408,246 discloses a housing for a battery operated chain saw. Normally battery operated chain saws have their power pack inserted at the rear of the housing; usually at the end of the rear handle. U.S. Pat. No. 5,685,080 discloses a battery powered chain saw with a battery removably connected at an end of a handle.

One of the hazards of operating a chain saw occurs when the teeth on the chain catch on something as they rotate around the tip of the blade. The teeth may have enough force to cause the blade to kick back violently towards the user. This is commonly referred to in the art as "kick back".

The disadvantage of having the power pack inserted behind the rear handle is that the center-of-gravity of the chain saw is behind the front handle. Thus, when kick back occurs during operation, the rearwardly located center-of-gravity will amplify the kick back action. The saw will tend to pivot in the user's hand at the front handle.

There is a desire to provide a battery operated chain saw which does not have a kick-back amplification due to battery placement. However, there is also a desire to allow the battery to still be removable, so the battery can be replaced by a second battery for prolonged use of the tool for more than a single battery charge.

SUMMARY OF THE INVENTION

In accordance with one aspect of the present invention, a battery operated chain saw is provided including a frame, an electric motor and a battery. The frame includes a housing and a chain bar. The frame forms a front handle and a rear handle. The electric motor is connected to the frame. The battery is coupled to the electric motor. The battery is located at a position on the frame proximate the front handle to provide a front-to-rear chain saw center-of-gravity located proximate the front handle.

In accordance with another aspect of the present invention, a chain saw is provided comprising a frame comprising a housing and a chain bar, wherein the frame forms a front handle and a rear handle; an electric motor connected to the frame; and a power pack coupled to the electric motor. The power pack is removably connected to the frame proximate a lateral side of the frame proximate the front handle.

In accordance with another aspect of the present invention, a chain saw is provided comprising a frame comprising a housing and a chain bar, wherein the frame forms a front handle and a rear handle; an electric motor connected to the frame; and a power pack removably connected to the frame. The power pack is located spaced from a front-to-rear centerline of the frame located along the chain bar. The power pack comprises an electrical coupling side which is not located on a lateral side of the power pack.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
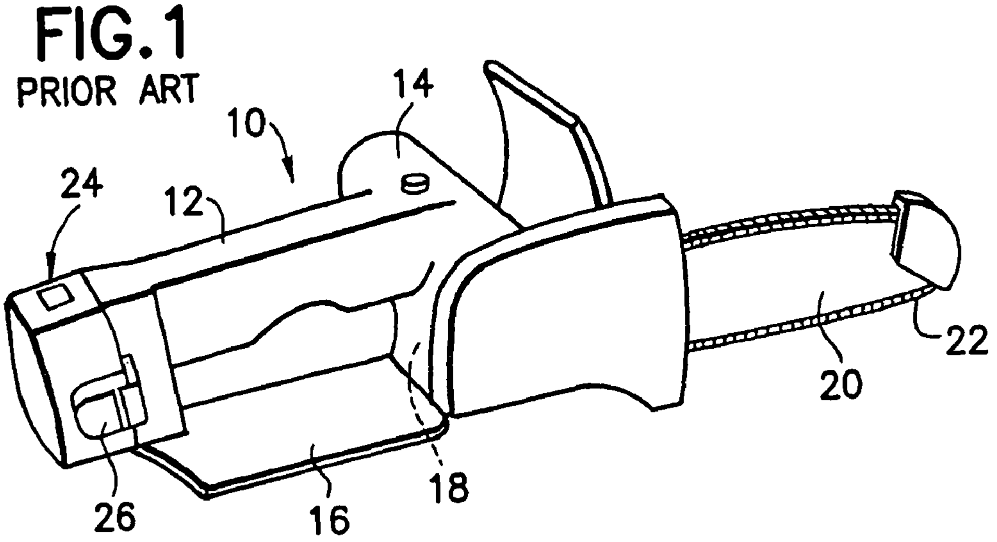
FIG.1 PRIOR ART
FIG. 1 is a perspective view of a conventional battery operated chain saw.

Referring to FIG. 1, there is shown a perspective view of a conventional battery operated chain saw 10. The chain saw 10 generally comprises a housing 16, an electric motor 18, a chain bar 20, a saw chain 22, and a power pack 24. The housing 16 forms a rear handle 12 and a front handle 14. The power pack 24 is removably connected to the rear end of the rear handle 12. The power pack 24 includes a latch 26 on a lateral side of the power pack to allow users to removably connected the power pack to the housing 16.

Figure 2:
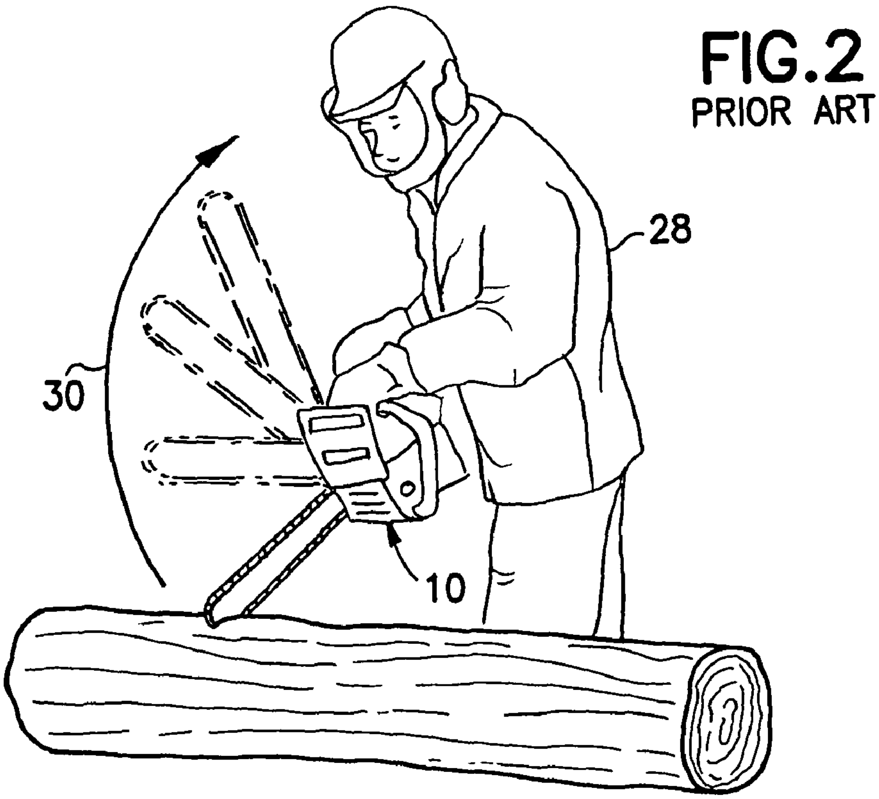
FIG.2 PRIOR ART
FIG. 2 is a diagrammatic view showing a user experiencing kick back during operation of the chain saw shown in FIG. 1.

Referring also to FIG. 2, as noted above, one of the hazards of operating the chain saw 10 occurs when the teeth on the chain 22 catch on something as they rotate around the tip of the blade 20. The teeth may have enough force to cause the blade to kick back violently towards the user 28 as illustrated by arrow 30. The disadvantage of having the power pack 24 inserted behind the rear handle 12 is that the center-of-gravity of the chain saw is closer to the rear handle. Thus, when kick back occurs during operation of this conventional type chain saw, the rearwardly located center-of-gravity will amplify the kick back action because the chain saw 10 will tend to pivot in the user's hand on the front handle 14.

Figure 3:
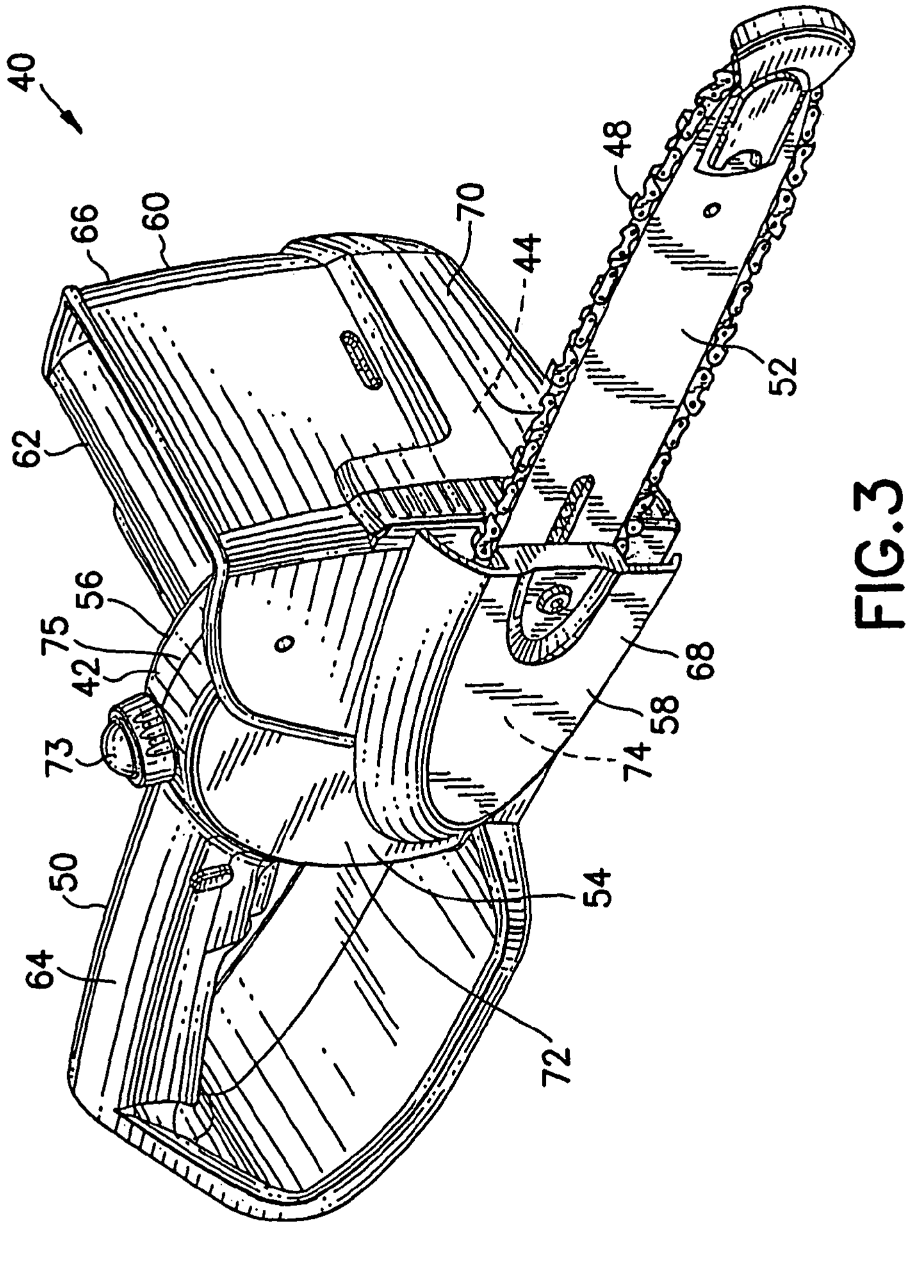
FIG. 3 is a perspective view of a chain saw incorporating features of the present invention.
Figure 4:
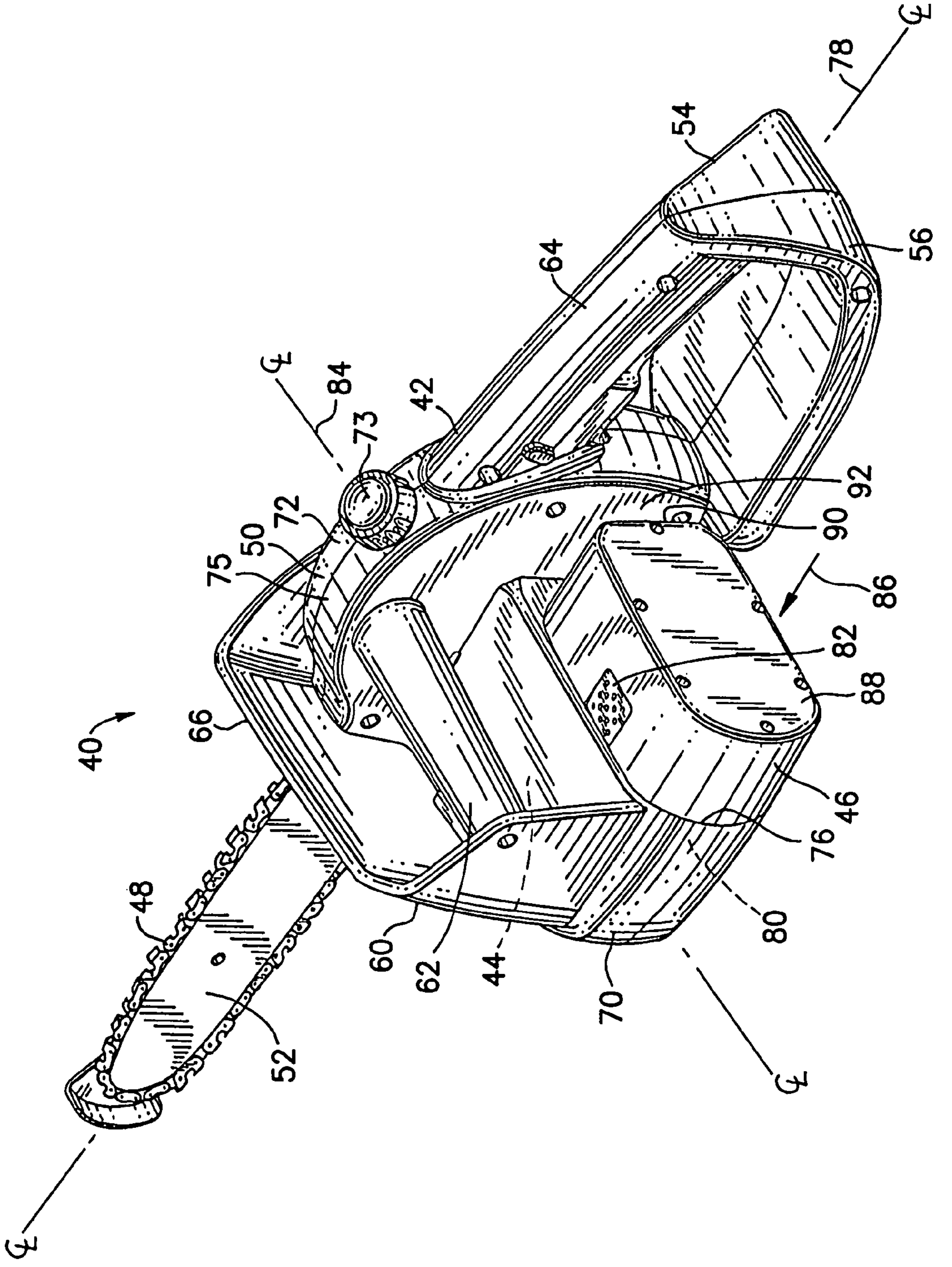
FIG. 4 is a perspective view of the chain saw shown in FIG. 3 taken from an opposite direction.

Referring to FIGS. 3 and 4, there are shown perspective views of a chain saw 40 incorporating features of the present invention. Although the present invention will be described with reference to the exemplary embodiment shown in the drawings, it should be understood that the present invention can be embodied in many alternate forms of embodiments. In addition, any suitable size, shape or type of elements or materials could be used.

The chain saw 40 generally comprises a frame 42, an electric motor 44, a power pack 46, and a saw chain 48. The frame 42 generally comprises a housing 50 and a chain bar 52. The chain bar 52 is generally well known in the art. The chain bar 52 provides a track which allows the saw chain 48 to rotates along the top and bottom sides of the chain bar in a defined path. The housing 50 generally comprises molded plastic or polymer housing members 54, 56, 58, 60 which are connected to each other to form the housing. The housing members form a front handle 62, a rear handle 64, a hand guard 66, a drive cover 68, a section 70 which houses the electric motor 44, a section 72 which houses a drive between the electric motor 44 and the saw chain 48 and a chain lubricating system 73, and a battery receiving area 76. However, in alternate embodiments, the housing could comprise any suitable shape and any suitable housing members could be provided. In this embodiment, the front handle 62 is part of the housing member 56 and extends laterally outward from the main section 75 as a general cantilevered section from member 56. The outer end of the front handle 62 is attached to a side section of the guard 66. The guard 66 extends in front of the front handle 62.

The battery receiving area 76 is located at a rear side of the section 70 of the housing. The battery receiving area 76 is located at a lateral side of a main section 75 of the housing which houses the drive 74. The section 70 is located beneath the front handle 62. The chainsaw comprises a front-to-rear cutting centerline 78 which extends through the length of the chain bar 52 and the rear handle 64. The section 70 is located at a lateral side relative to the centerline 78. Thus, the battery receiving area 76 is located laterally spaced from the centerline 78.

The power pack 46 forms a removable and rechargeable battery for the chain saw 40. In a preferred embodiment, the power pack comprises an 18 Volt battery. However, in alternate embodiment, any suitable voltage battery could be provided by the power pack. The power pack 46 comprises a front end 80 which forms an electrical coupling side for the power pack. The front end 80 is inserted into the battery receiving area 76 to electrically couple the power pack 46 to the electric motor 44. The power pack 46 comprises a mechanical connection latch 82. The latch 82 is adapted to be moved by a user to allow the power pack 46 to be removably connected to the housing 50. In the embodiment shown, the latch 82 is not located on a lateral side of the power pack. The latch 82 is located on a top side of the power pack. Additionally, or alternatively, another latch could be located on a bottom side of the power pack. Another type of alternate embodiment might comprise a mechanical connection latch on the housing adapted to engage a portion of the power pack.

The power pack 46 has a general oval or racetrack profile when viewed from its rear end 88. The right lateral side 90 is preferably flat to allow the right lateral side to be located in close proximity to the side 92 of the main section 75. However, the side 90 is preferably slightly spaced from the side 92. The power pack 46 is preferably a power pack which is adapted to be alternatively used with a plurality of different types of battery operated power tools. For example, the power pack 46 could be attached to the bottom of a handle of an electric drill. Thus, the front end 80 and latch 82 are preferably adapted for use and connection with a plurality of different battery operated power tools.

The power pack 46 is located at a position on the frame proximate the front handle 62 to provide a front-to-rear chain saw center-of-gravity 84 located proximate the front handle 62. The power pack 46 is located spaced from the front-to-rear cutting centerline 78. The power pack 46 is removably connected to the frame proximate the left lateral side of the frame proximate the front handle. In the preferred embodiment, the power pack comprises an electrical coupling side which is not located on a lateral side of the power pack, but instead is located at the front end 80 of the power pack.

In the preferred embodiment, the power pack 46 is connected into the battery receiving area 76 in a forward connection direction 86. This allows the front of connection end 80 and the latch 82 to be a standard type of connection end and latch such that the power pack can be connected to other types of battery operated power tools. In other words, the configuration of the battery receiving area 76 allows the chain saw 40 to be used with a modular removable power pack with a standard type of front connection end and mechanical connection latch. The user merely needs to orientate the power pack 46 properly and insert the power pack into the battery receiving area 76 in direction 86. The power pack 46 is located substantially beneath the front handle 62 to provide a chain saw center-of-gravity located proximate to the front handle rather than reward from the front handle. In a preferred embodiment, the front-to-rear chain saw center-of-gravity is located in front of the centerline of the front handle.

The present invention provides a new battery operated chain saw which has the power pack ideally placed under the front handle. As a result, the horizontal center-of-gravity is at the front handle of the saw. This design will provide optimum handling of the saw and will not amplify or assist kick back action. As noted above, the power pack 46 is preferably an 18 Volt power pack. This is a larger and heavier power pack that convention power packs used in prior battery operated chain saws. If an 18 Volt power pack was used for the power pack 24 in the chain saw 10 of FIG. 1 and a kick back occurred, the chain saw 10 would produce an even larger kick back action and force. Thus, the present invention allows a heavier power pack to be used in a chain saw than conventional smaller voltage chain saw power packs without increasing kick back force if a kick back action occurs.

For some products sold in the United States and elsewhere, there is a desire to obtain a certification from Underwriters Laboratories Inc. Underwriters Laboratories Inc. (UL) is an independent, not-for-profit product safety testing and certification organization. UL 1662 part 26.5, which relates to chain saws, reads: "The balance of the saw shall be such that when it is supported by its carry handle, the saw guide bar will remain stationary and not tend to rotate about the carry handle more than 15 degrees above or 30 degrees below the horizontal when imbalanced". Part 26.5 of UL 1662 was a major problem in attempting to obtain a UL certification for a battery operated chain saw. If the battery pack is placed at the end of rear handle (such as in a known Makita chain saw), the chain saw does not comply with UL 1662 part 26.5 when held by the carry handle (front handle). The present invention overcomes this problems and allow a chain saw incorporating the present invention to meet certification standards for UL 1662 part 26.5.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A battery operated chain saw comprising:

a frame comprising a housing and a chain bar, wherein the frame forms a front handle and a rear handle;

an electric motor connected to the frame; and a battery coupled to the electric motor, wherein the battery is located at a position on the frame proximate the front handle; and wherein the battery is located on the frame to provide a front-to-rear chain saw center-of-gravity located at least partially beneath or at least partially in front of the front handle.

2. A battery operated chain saw as in claim 1 wherein the frame comprises molded polymer members forming housing members connected to each other to form the housing, the front handle and the rear handle.

3. A battery operated chain saw as in claim 2 wherein the housing members form a guard connected to the front handle and extending in front of the front handle.

4. A battery operated chain saw as in claim 1 wherein the housing forms a battery receiving area located beneath the front handle.

5. A battery operated chain saw as in claim 1 wherein the housing forms a battery receiving area located at a lateral side of a portion of the housing which houses a drive which connects the motor to a saw chain of the chain bar.

6. A battery operated chain saw comprising:
a frame comprising a housing and a chain bar, wherein the frame forms a front handle and a rear handle;
an electric motor connected to the frame; and
a battery coupled to the electric motor,
wherein the battery is located at a position on the frame proximate the front handle to provide a front-to-rear chain saw center-of-gravity located proximate the front handle, and
wherein the battery is removably connected to the frame proximate a section of the housing which houses the electric motor at least partially behind the electric motor.

7. A battery operated chain saw as in claim 1 wherein the battery is housed in a removable power pack, and wherein the power pack is located spaced from a front-to-rear centerline of the frame located along the chain bar, and wherein the power pack comprises an electrical coupling side which is not located on a lateral side of the power pack.

8. A battery operated chain saw as in claim 1 wherein the battery is housed in a removable power pack, and wherein the power pack is removably connected to the frame proximate a lateral side of the frame proximate the front handle, and wherein the power pack comprises an electrical coupling side facing a forward direction of the chain saw.

9. A battery operated chain saw as in claim 1 wherein the battery is housed in a removable power pack, and wherein the power pack comprises a mechanical connection latch adapted to be contacted and moved by a user, and wherein the latch is not located on a lateral side of the power pack.

10. A chain saw comprising:
a frame comprising a housing and a chain bar, wherein the frame forms a front handle and a rear handle;
an electric motor connected to the frame; and
a power pack coupled to the electric motor, wherein the power pack is removably connected to the frame proximate a lateral side of the frame, and at least partially below the front handle, further comprising means for providing a front-to-rear chain saw center-of-gravity located proximate the front handle.

11. A chain saw as in claim 10 wherein the frame comprises molded polymer members forming housing members connected to each other to form the housing, the front handle and the rear handle.

12. A chain saw as in claim 11 wherein the housing members form a guard connected to the front handle and extending in front of the front handle.

13. A chain saw as in claim 10 wherein the housing forms a battery receiving area located at least partially beneath the front handle.

14. A chain saw as in claim 10 wherein the housing forms a battery receiving area located at a lateral side of a portion of the housing which houses a drive which connects the motor to a saw chain of the chain bar.

15. A chain saw as in claim 10 wherein the power pack is removably connected to the frame proximate a section of the housing which houses the electric motor.

16. A chain saw as in claim 10 wherein the power pack is located spaced from a front-to-rear centerline of the frame located along the chain bar, and wherein the power pack comprises an electrical coupling side which is not located on a lateral side of the power pack.

17. A chain saw as in claim 10 wherein the power pack is removably connected to the frame proximate a lateral side of the frame, and wherein the power pack comprises an electrical coupling side facing a forward direction of the chain saw.

18. A chain saw as in claim 10 wherein the power pack comprises a mechanical connection latch adapted to be contacted and moved by a user, wherein the latch is not located on a lateral side of the power pack.

19. A chain saw comprising:
a frame comprising a housing and a chain bar, wherein the frame forms a front handle and a rear handle;
an electric motor connected to the frame; and
a power pack removably connected to the frame proximate a lateral side of the frame and at least partially in front of the front handle, wherein the power pack is located entirely spaced from a front-to-rear centerline of the frame located along the chain bar.

* * * * *